United States Patent [19]

Ferriss et al.

[11] Patent Number: 4,856,901
[45] Date of Patent: Aug. 15, 1989

[54] VELOCITY CONTROL SYSTEM USING PIEZOELECTRIC TRANSDUCERS

[75] Inventors: Lincoln S. Ferriss, Denville; Mark A. Weitzner, Union, both of N.J.

[73] Assignee: Kearfott Guidance & Navigation Corporation, Wayne, N.J.

[21] Appl. No.: 190,195

[22] Filed: May 4, 1988

[51] Int. Cl.[4] .................... G01C 19/64; B06B 1/06; H02N 2/00
[52] U.S. Cl. ...................................... 356/350; 310/316
[58] Field of Search .................. 356/350; 310/316

[56] References Cited

U.S. PATENT DOCUMENTS

| | | | |
|---|---|---|---|
| 3,889,166 | 6/1975 | Scurlock | 310/316 X |
| 4,314,174 | 2/1982 | Wing et al. | 310/316 X |

Primary Examiner—Vincent P. McGraw

[57] ABSTRACT

A piezoelectric activated dither suspension system for a ring laser gyroscope has all of the transducer elements connected in parallel to simultaneously produce sustaining torque for dither motion and respond to a back component of current produced by the vibrational motion of the gyro block. The generated current, separated from drive currents from the torquer amplifier by a transformer or, in an alternative embodiment, by sensing resistors, produces the very signal used to control and sustain the oscillations. By utilizing all transducers both as torquer and pickoff elements, economies of drive efficiency, wiring simplification and circuit redundancies are achieved.

23 Claims, 3 Drawing Sheets 4,856,901

VELOCITY CONTROL SYSTEM USING PIEZOELECTRIC TRANSDUCERS

FIELD OF THE INVENTION

The present invention relates to the application of bilateral piezoelectric transducers attached to motional mechanical elements to couple torque and to respond to deflections or rates of the elements, by using the same transducers so as to attain certain economies and reliability.

BACKGROUND OF THE INVENTION

For a ring laser gyroscope, hereinafter RLG, it is well known that there are two laser beams propagating in opposite directions within a cavity of the RLG. Any frequency difference between these two light beams represents an inertial rotation. In order to avoid the problems of the well-documented lock-in effect, the RLG may be dithered about its axis. For a three-axis RLG assembly, it has been taught in U.S. Pat. No. 4,477,188 by Stiles, et al. that the three RLGs in the assembly can be dithered about an axis equally shared by all three RLGs. Dithering, as was pointed out, is an angular vibration imposed upon the body of the RLG and is a well-accepted means of mitigating the lock-in effect.

To perform the dithering, conventionally a dither spring suspension mechanism, which includes a plurality of transducers, is used. These transducers are made up of piezoelectric elements which, as is well known, are "bilateral"—being able to convert an electrical signal into a physical movement and, conversely, convert a physical movement into an electrical signal. To ensure that the rate at which the RLG is dithered is of the proper amplitude, a means for amplitude control is used. Currently, to obtain a measure of the dither rate, one or two of the transducers in the dither spring suspension mechanism are used as sensors for detecting the motion of the RLG body, since, as was discussed earlier, these transducers are "bilateral" and thus can be used both as sensors and actuators. When used as a sensor, the transducer is known as a pickoff element. When used to dither, the transducer is known as a torquer element.

Yet problems do exist for the prior art feedback system. The most notable of the problems occurs when the pickoff transducer element fails. In the case of a single pickoff transducer feedback system, when the single pickoff transducer element fails, the RLG no longer operates, for not only does the suspension system not have a pickoff signal for providing the regeneration required to maintain the system in an oscillatory condition, but also no measure of rate is available.

For a feedback system which has two pickoff transducer elements, when one of the pickoff elements fails, half of the feedback signal is lost. Consequently, the control system responds by driving the torquer elements with a larger signal in attempting to restore the pickoff signal to the initial amplitude. If it is capable of such overdrive, the system will end up with twice the desired amplitude of dither motion. Often, however, large amplitudes have a deleterious effect not only on the performance of the instrument but also on the ability of the electronics to sustain the overdrive, or of the driven transducers to survive. Similar scenarios can be constructed for cases using three, and more pickoff elements.

So far as known, a maximum of two pickoff transducer elements is used. This is due to the fact that were more of the transducer elements used as pickoff sensors, proper dithering of the RLG becomes difficult, as there no longer would be a sufficient number of transducers to dither the RLG, since dithering results from a summation of the deformation of the different torquer transducer elements, in response to a driving signal.

SUMMARY OF THE PRESENT INVENTION

The present invention resolves the aforenoted problems by utilizing each one of the transducer elements for both torquing the RLG and sensing the velocity of the same. The present invention is able to achieve this end because of the recognition by the inventors that there is a back current generated by the transducer elements of the dither spring mechanism in response to the motion of the RLG. And if this back current component can be separated from other components of the transducer elements, the motion of the RLG can be ascertained.

In implementation, the present invention technique subtracts the actual current in the torquer transducer elements from a current in a non-moving member that does not exhibit the motional component, thereby deriving the motional component for use as a pickoff signal for closing the feedback, or oscillation, loop. As a consequence, all of the transducer elements can be used both as torquer elements and pickoff sensing elements. Thus, in a ten transducer element dither spring suspension mechanism, were one of the transducers to fail, the feedback signal would be degraded only by one tenth, as compared to the prior art where the RLG may very well become inoperative.

It is thus an objective of the present invention to provide for a dither spring suspension mechanism wherein all of the transducer elements may be used as torquer and pickoff elements.

It is a further general objective of the present invention to attach bilateral piezoelectric elements to motional mechanical elements for both torquing the mechanical elements and responding to the torquing rates of the same.

BRIEF DESCRIPTION OF THE DRAWINGS

The above-mentioned objectives and advantages of the present invention will become more apparent and the invention itself will be best understood by reference to the following description of embodiments of the invention taken in conjunction with the accompanying drawings, wherein.

DETAILED DESCRIPTION OF THR PRESENT INVENTION

Figure 1:
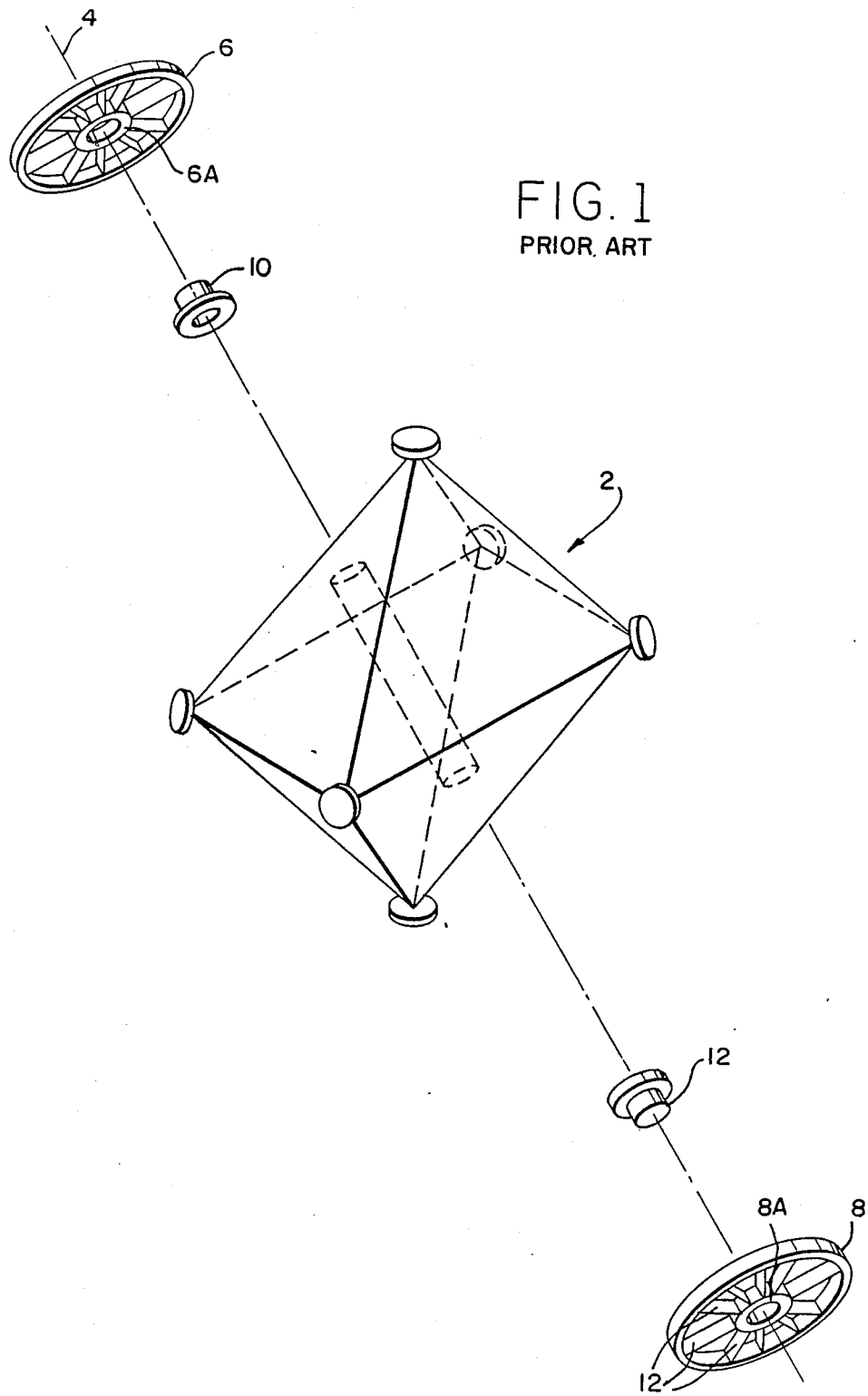
FIG. 1 is an isometric exploded view of a prior art three-axis ring laser gyroscope assembly including dither spring suspension mechanisms.

Referring to FIG. 1, there is shown an isometric exploded view of a conventional three-axis ring laser gyroscope assembly 2 aligned along an axis 4. Two dither spring suspension mechanisms 6 and 8 are shown to be disposed on either side of RLG assembly 2 along axis 4. These suspension mechanisms 6 and 8 fit over hubs 10 and 12, respectively, which in turn are fastened to corresponding faces of assembly 2. Each of mechanisms 6 and 8 has a central annular opening 6A and 8A to facilitate attachment to hubs 10 and 12, respectively.

Of import to note in FIG. 1 is that for each of the spring suspension mechanisms, there are a plurality of leaves 12 extending from the corresponding central annular opening to the rim of the corresponding spring suspension mechanism. For the sake of simplicity, only the leaves in mechanism 8 have been labeled. Also, although not shown in FIG. 1, each leaf has fixedly coupled thereto a piezoelectric transducer element (P1 to P10), shown in FIG. 2. Heretofore, with the exception of either one or two of the transducer elements, the remainder of the transducer elements—by movement in reaction to torque command signals—are used to excite spring mechanism 8 for dithering gyro block 2, in order to prevent lock-in of the RLG.

Figure 2:
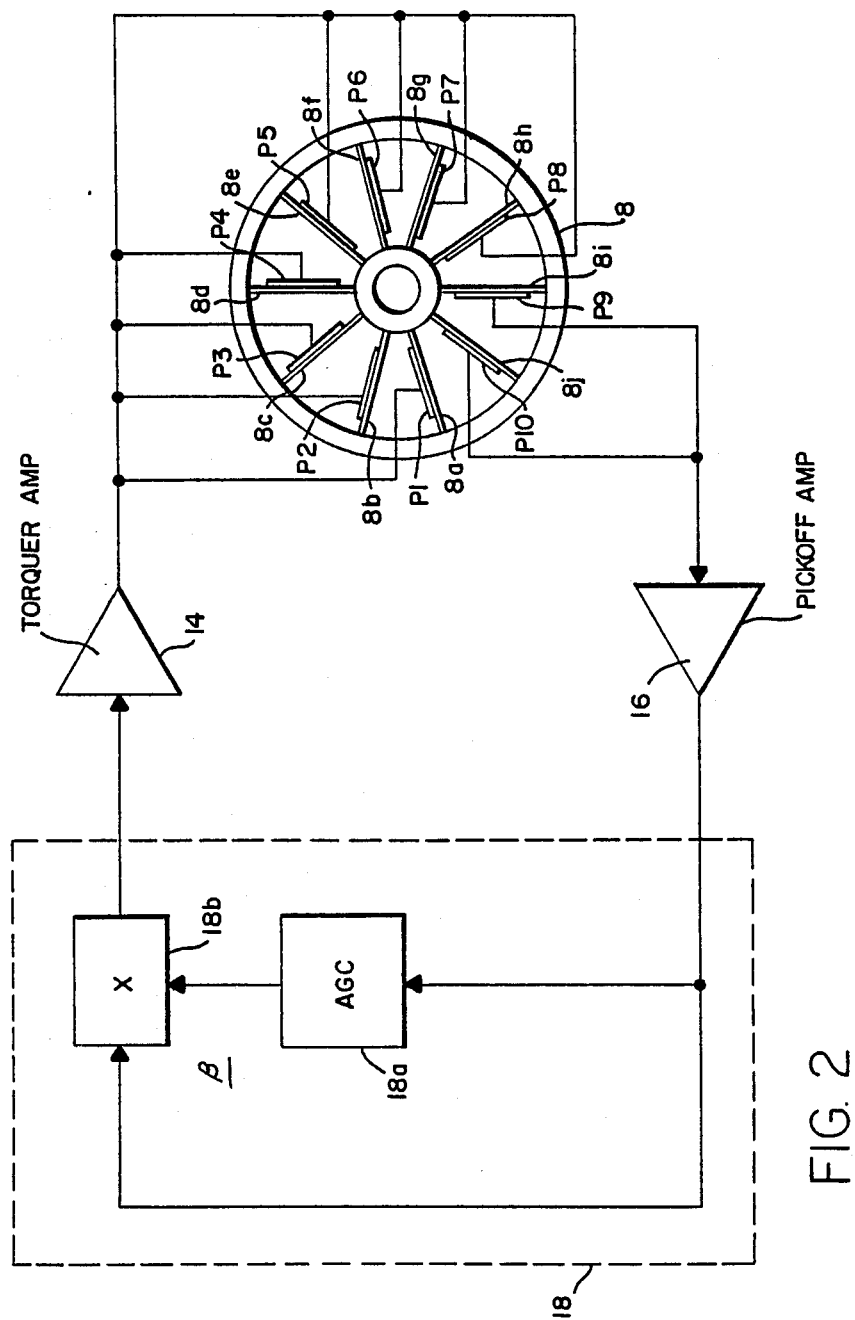
FIG. 2 is a combination block diagram and plan view of a prior art dither spring suspension mechanism for a ring laser gyroscope.

The operation of the spring suspension mechanism is further illustrated in the simplified semi-block diagram of FIG. 2 wherein mechanism 8 is shown to have ten leaves 8a to 8j. It should be noted that although ten leaves are shown for this embodiment, a different number of leaves, greater or less than ten, may also be utilized in a spring suspension mechanism.

Continuing with FIG. 2, it can be seen that transducer elements P1 to P8 are connected in parallel to the output of a torquer amplifier 14 while transducer elements P9 and P10 are connected in parallel to an input of a pickoff amplifier 16. The output of pickoff amplifier 16 is fed to a conventional positive feedback β network 18 having an AGC circuit 18a and a multiplier circuit 18b, the output of which is fed to the input of torquer amplifier 14. In essence, the output from pickoff amplifier 16 is multiplied with some constant, i.e. a gain factor, and fed to torquer amplifier 14 which, in response to the amplified signal, generates a signal, in the form of a voltage, to drive piezoelectric elements P1 to P8, coupled fixedly to respective leaves 8a to 8h of spring suspension mechanism 8. For this two-element pickoff suspension mechanism, it can be seen that piezoelectric elements P9 and P10 are fixedly coupled to leaves 8i and 8j, respectively. As was discussed previously, because of the "bilateral" nature thereof, piezoelectric transducer elements P1 to P8 would, in response to the output voltage from torquer amplifier 14, deform, thereby vibrating spring suspension mechanism 8, which in turn dithers the gyro block of the ring laser gyroscope assembly.

On the other hand, when used as sensing elements, piezoelectric elements such as P9 and P10 would, in response to the sensed motion of the gyro block (by means of mechanically coupled feedback vibration to the spring suspension mechanism), convert the motion to an electrical signal, which is sent to the input of pickoff amplifier 16. In view of the fact that only two of the piezoelectric elements are used for detecting the motion of the gyro block, in the event that one of the piezoelectric elements fails, 50% of the sensed signal would be lost. Therefore, absent some additional fault—detection means, improper operation would result. An even more ominous scenario entails if only one of the piezoelectric elements is used as the sensing, or pickoff, element. In which case even though the RLG would most likely continue to function, there is no means to ameliorate the effects of the lock-in.

Figure 3:
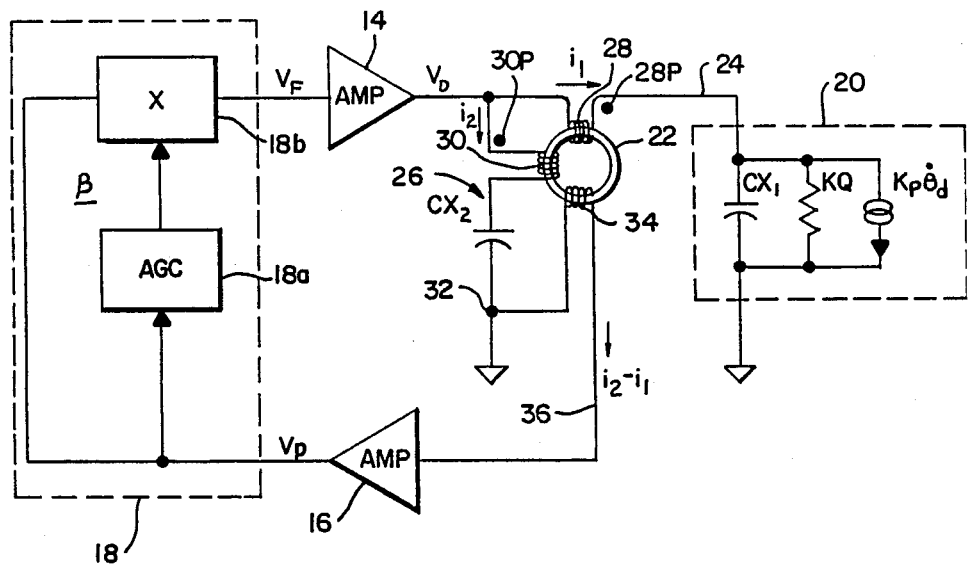
FIG. 3 is a schematic diagram of a first embodiment of the present invention.

FIG. 3 illustrates a first embodiment of the present invention wherein the electromechanical system consisting of the piezoelectric elements and the suspension mechanism has been replaced by an electrical equivalent circuit, encircled by dotted box 20. For ease of comprehension, like elements are labeled the same.

As recognized by the inventors, a spring suspension mechanism, or more precisely the piezoelectric elements coupled to the leaves therein, when fed a voltage such as $V_D$ from torquer amplifier 14, will produce a current $i_1$, which is a combination of three different components: a capacitor current $C_{X1}$, an effective resistance current KQ and a back current $K_p\dot{\Theta}_d$, which is generated as a result of the deformation of the piezoelectric elements. Putting it another way, a quadrature current results from $C_{X1}$, an in-phase resistance component results from KQ and an in-phase current results from $K_p\dot{\Theta}_d$.

The present invention embodiment of FIG. 3 further includes a current transformer 22 having a first primary winding 28 connected between the output of amplifier 14 and line 24, and a second primary winding 30 also connected to the output of amplifier 14 but between it and capacitor $C_{X2}$, the other side of which is grounded. A simple secondary winding 34 is connected between pickoff amplifier 16 and ground.

Also shown in FIG. 3 is multiplier circuit 18b and AGC circuit 18a, both of which, per discussion for FIG. 2, are considered as a part of positive feedback β network 18. The components of box 20 may be represented as capacitor $C_{X1}$, resistor KQ and current source $K_p\dot{\Theta}_d$. It should be appreciated that resistor KQ is not a real resistor but, rather, represents the dissipative element in the system to account for the real power being required due to the finite Q (quality factor of the resonance) of the suspension mechanism.

Each of the components shown in FIG. 3 is conventional. For example, transformer 22 may be a conventional audio transformer having two primary windings and a single secondary winding. Torquer amplifier 14 may be a high voltage amplifier or a moderately high voltage amplifier while pickoff amplifier 16 is a conventional type amplifier.

The FIG. 3 circuit operates as follows. As shown, an output voltage $V_D$ from torquer amplifier 14 is fed to box 20, i.e. the electrical model for the piezoelectric elements and a spring suspension system. It should be noted that for this embodiment, as was discussed earlier, all of the piezoelectric elements are connected in parallel. The elements $C_{X1}$, KQ and $K_p\dot{\Theta}_d$ together represent the electrical equivalent circuit of the piezoelectric elements, parallel-connected, as coupled to the dither suspension system. $C_{X1}$ is the bulk, static capacitance of the elements, and KQ represents the value of the resistance. (It should be noted that resistance is required in an electrical circuit to dissipate power; the kind of energy produced by the dither suspension system is heat, by virtue of frictional loss in the mechanism, air resistance to motion of the leaves, inelastic motion of the glue which holds the piezoelectric element drives onto the leaves, etc.) In this equivalent circuit, the same amount of heat is generated, by electricity flowing in the resistor.

Specifically, $P = V^2/R$ where P = power, $V = V_D$ and R = KQ. It is well known that the higher the Q, the less the power loss—this is due to the fact that R is in the denominator of the power equation such that as Q increases, power gets less. K is a conversion/scaling factor which converts the mechanical loss mechanisms to a single electrical loss mechanism, namely, the value of the resistor. $K_p \dot{\Theta}_d$ is a current generator representing the sum of the currents produced by the piezoelectric elements in response to an angular rate the time derivative of the angular displacement of the piezoelements. $K_p$ is the scaling factor, having units of amperes-radians$^{-1}$-sec, and accounting for a plurality of piezo elements. From calculations based on the well-known Kirchoff's laws, one skilled in the art can show the following:

$$i_1 = j\omega_d\, C_{x_1}\, V_D + \frac{V_D}{KQ} + K_p \dot{\Theta}_d \qquad (1)$$

$$i_2 = j\omega_d\, C_{x_2}\, V_D \qquad (2)$$

where
  $i_1$ = current flowing through winding 28;
  $i_2$ = current flowing through winding 30; and
  $\omega_d$ = radian frequency.

From the action of current transformer 22, with current $i_1$ flowing in winding 28 and current $i_2$ flowing in winding 30, and with the windings opposed rather than aiding (see the respective polarities of the windings, as designated by dots 30p and 28p), those knowledgeable about transformers would agree that a current $i_2 - i_1$ could be generated in winding 34 when the circuit is appropriately loaded and when the turns ratios of the windings are considered. For example, if $C_{x_2}$ is selected to equal $C_{x_1}$, and if $V_D/KQ$ is small, due to the high quality factor Q of the mechanical resonance of the system, the difference current, $i_2 - i_1$ would equal $K_p \dot{\Theta}_d$, a value representative of the angular rate of the dither suspension system.

The FIG. 3 embodiment establishes a quadrature current by means of capacitor $C_{x_2}$, which is picked up by transformer 22, resulting in current $i_2 - i_1$ being fed to pickoff amplifier 16. In other words, the component of the current through capacitor $C_{x_1}$ along line 24 equals the current through capacitor $C_{x_2}$ along line 26, with the value of capacitor $C_{x_2}$ being trimmed to be equal to that of capacitor $C_{x_1}$. Thus, the current that is left from the subtraction of current $i_1$ from $i_2$ is the back current created by the deformation rate of the piezoelectric elements, which is proportional to the velocity of the motion of the gyro block.

The resulting current is, as shown in FIG. 3, fed as an input to pickoff amplifier 16 which, being a current to voltage amplifier, converts the resulting current into a voltage $V_P$, to be fed to $\beta$ network 18. As is well known, automatic gain control AGC circuit 18a and multiplier circuit 18b of $\beta$ network 18, upon receipt of voltage $V_P$, generates a feedback signal $V_F$ to torquer amplifier 14, thereby effecting a closed electrical feedback loop for the FIG. 3 embodiment. Torquer 14, of course, as was discussed earlier, in receipt of signal $V_F$, generates voltage $V_D$, which in turn is used to oscillate the piezoelectric elements, thereby producing current $i_1$.

Regressing for the moment, it should be pointed out that to facilitate the description of the embodiment of FIG. 3, the value of capacitor $C_{x_2}$ is chosen equal to that of $C_{x_1}$, and the turns ratio of winding 30 to 28 is unity. In a practical implementation, however, the value of $C_{x_2}$ would be chosen to be smaller than the value of $C_{x_1}$. The reason is that capacitance loads imposed by $C_{x_2}$ and $C_{x_1}$ decrease the efficiency of amplifier 14 by requiring it to supply currents which are not productive of useful torque. By making $C_{x_2}$ smaller, the total capacitive load, $C_{x_2} + C_{x_1}$, is not that much greater than that imposed by $C_{x_1}$ alone. But to effect the equivalent flux cancellation in the transformer's magnetic core, the turns ratio of winding 30 to 28 would be the reciprocal of the capacitance ratio $C_{x_2}/C_{x_1}$.

Figure 4:
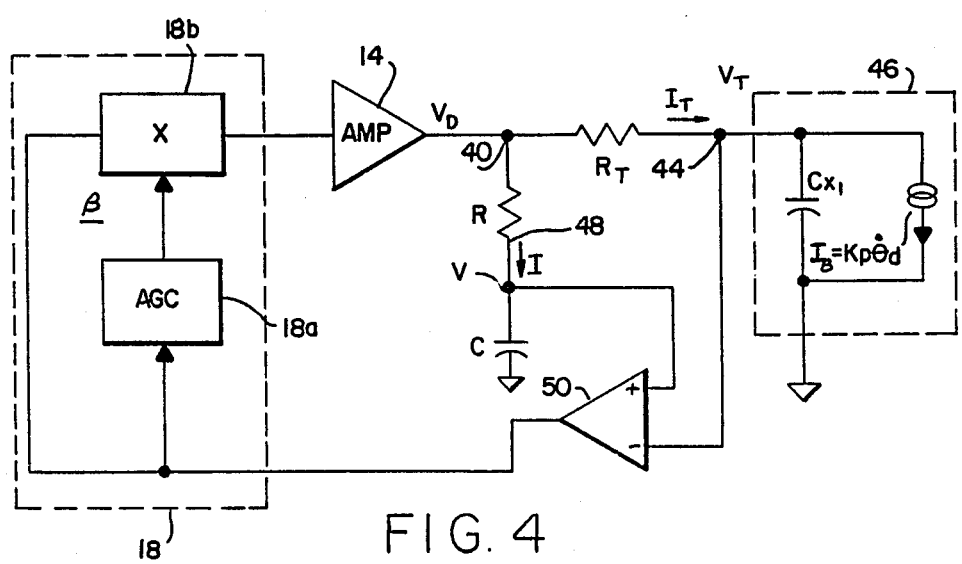
FIG. 4 is a schematic diagram of a second embodiment of the present invention.

Recognizing that the present invention is based on the concept of sensing the difference between different currents, a second embodiment of the present invention which utilizes current sensing resistors in place of transformer 22 is shown in FIG. 4. There it is shown that, instead of a transformer, current sensing resistors R and $R_T$ are inserted respectively between junction 40 and capacitor C and between junction 40 and junction 44. The FIG. 4 embodiment shows, as before, a torquer amplifier 14 providing a voltage $V_D$ toward junction 40. For this embodiment, since current sensing resistors are used, a person skilled in the art can readily see that the current generated in response to voltage $V_D$, by the spring suspension mechanism represented by dotted box 46, contains only a torquer capacitance $C_{x_1}$ and a back current $I_B = K_p \dot{\Theta}_d$, both of which are generated by the combination of all of the piezoelectric elements of the spring suspension hinge connected in parallel. As mentioned earlier, the current component due to mechanical losses, designated as KQ in FIG. 3, is relatively small for a high Q system and has been left out.

Like the FIG. 3 embodiment, but instead of capacitor $C_{x_2}$, the FIG. 4 embodiment uses a buck out capacitor C along line 48. Thus, current sensing resistor R and buck out capacitor C are series connected. As is well known, by means of sensing resistor R, current I flowing through line 48 to ground is converted to a voltage drop across R. Likewise, current $I_T$, due to sensing resistor $R_T$, is converted to a voltage drop across $R_T$.

It can be shown with Kirchoff's laws that:

$$V_T = \frac{V_D - I_B R_T}{(SR_T C_{x_1} + 1)} \qquad (3)$$

where
  $S = j\omega$; and
  $\omega$ = radian frequency $$V = \frac{V_D}{(SRC + 1)} \qquad (4)$$

$$(V - V_T) = \frac{V_D}{(SRC + 1)} - \frac{V_D - I_B R_T}{(SR_T C_{x_1} + 1)} \qquad (5)$$

Let $R = NR_T$ and $C = C_{x_1}/N$ $$(V - V_T) = \frac{I_B R_T}{(SR_T C_{x_1} + 1)} \qquad (6)$$

Over a practical frequency range and for purposes of this invention:

$$SR_T C_{x_1} \ll 1$$

$$K_p \dot{\Theta}_d = I_B \approx \frac{(V_T - V)}{R_T} \qquad (7)$$

$$\dot{\Theta}_d \approx \frac{(V_T - V)}{K_p R_T} \qquad (8)$$

As can be seen in equation 8, the velocity of the suspension mechanism is proportional to the difference in voltages $V_T$ and V. And since there are now two different voltages, the FIG. 4 embodiment further shows a differential amplifier 50 having as its inputs voltages V and $V_T$. The function of a differential amplifier, as is well known to one skilled in the art, is to provide as an output the difference between the voltages at its inputs. Accordingly, differential amplifier 50, in receipt of voltages V and $V_T$, generates a difference voltage, which corresponds to the motion of the gyro block, to feedback network 18, which, upon receipt of the difference signal, provides a signal to torquer amplifier 14 to generate a voltage to be fed to box 46. Thus, like the FIG. 3 embodiment, the FIG. 4 embodiment also results in a closed electrical feedback loop that provides a constant dither rate. Instead of directly measuring the difference in currents, the FIG. 4 embodiment, although also utilizing the recognition that the back current $I_B$ corresponds to the velocity of motion of the gyro block, measures the difference between two voltage drops.

For the FIG. 4 embodiment, the components shown therein are, like the FIG. 3 embodiment, conventional devices. And, of course, the FIG. 4 embodiment is based on the concept of cancelling voltages which have equal magnitudes due to the voltage drops across the respective sensing resistors. Putting it differently, the FIG. 4 embodiment is a transformer-less pickoff-less system.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. In a ring laser gyroscope assembly having a plurality of piezoelectric elements each fixedly coupled to a leaf of a suspension spring means for dithering a gyro block, a method of utilizing each piezoelectric element for both dithering the gyro block and for sensing motion of the gyro block, the method comprising the steps of:
   electrically connecting each piezoelectric element in parallel to an output of a torquer amplifier;
   feeding an output signal from the torquer amplifier to the piezoelectric elements to effect a deformation rate thereto for dithering the gyro block, the piezoelectric elements further producing a first current due to capacitance and motion of the gyro block;
   connecting a capacitance means from the output of the torquer amplifier to ground to generate a second current;
   adapting a transformer means to receive both the first and second currents and to produce a third current representing the difference between the first and second currents; and
   converting the third current into a pickoff voltage and feeding the same to a feedback means, the feedback means providing a feedback signal to the torquer amplifier;
   whereby a closed electrical feedback loop is effected to constantly maintain an optimal dither rate for the gyro block.

2. The method of claim 1, wherein the first current is produced by combining a capacitive current component, an effective resistance component and a back current component.

3. The method of claim 1, wherein the adapting step comprises:
   electrically coupling the transformer means to the output of the torquer amplifier and an input of a current-to-voltage amplifier; and
   electrically coupling the transformer means in parallel to the capacitance means.

4. The method of claim 1, wherein the converting step comprises:
   utilizing a current-to-voltage amplifier for converting the third current into the pickoff voltage.

5. The method of claim 2, further comprising the step of matching the capacitance value of the capacitive current component with the capacitance value of the capacitance means so that currents resulting from the respective values reacting with the output signal of the torquer amplifier are cancelled.

6. A combination pickoff and driver system for a ring laser gyroscope including a gyro block, comprising:
   a plurality of piezoelectric elements each fixedly coupled to a leaf of a suspension spring means for dithering the gyro block;
   a torquer amplifier having an output connected to the piezoelectric elements, the torquer amplifier feeding an output signal to the piezoelectric elements for effecting a deformation rate thereto to dither the gyro block, the piezoelectric elements producing a first current due to capacitance and motion of the gyro block;
   a capacitance means connected to the torquer amplifier for receiving the output signal and for generating a second current in response thereto;
   a transformer means electrically coupled to the output of the torquer amplifier, the piezoelectric elements and the capacitance means for receiving both the first and second currents, and generating a third current corresponding to the difference between the first and second currents;
   means electrically connected to the transformer means for receiving the third current and for converting the same into a pickoff voltage; and
   feedback means connected to the converting means for receiving and using the pickoff voltage to generate a feedback signal to be fed to the torquer amplifier, thereby effecting a closed electrical feedback loop to constantly maintain an optimal dither rate for the gyro block.

7. The system of claim 6, wherein the plurality of piezoelectric elements are connected in parallel to the output of the torquer amplifier, the piezoelectric elements deforming in response to the output signal for dithering the gyro block; and
   wherein the piezoelectric elements in combination produce a capacitive current component, an effective resistance component and a back current component.

8. The system of claim 7, wherein the capacitance means is a capacitor having a capacitance value trimmed to match the capacitance value of the capacitive current component so that currents resulting from the respective values reacting with the output signal from the torquer amplifier are cancelled.

9. The system of claim 6, wherein the converting means comprises a current-to-voltage amplifier.

10. The system of claim 6, wherein the feedback means comprises an automatic gain control circuit and a multiplier circuit.

11. A combination pickoff and driver system for a ring laser gyroscope including a gyro block, comprising:
   a plurality of piezoelectric elements each fixedly coupled to a leaf of a suspension spring means for dithering the gyro block;
   a torquer amplifier having an output connected to the piezoelectric elements, the torquer amplifier feeding an output signal to the piezoelectric elements for effecting a deformation rate thereto to dither the gyro block, the piezoelectric elements producing a first current due to capacitance and motion of the gyro block;
   a resistor means interposed between the torquer amplifier and the piezoelectric elements for converting the first current into a voltage drop;
   a series connected resistor and capacitor means interposed between the torquer amplifier and ground to produce a buck voltage;
   differential amplifier means for receiving and subtracting the torquer and buck voltages to produce a difference voltage, the difference voltage being representative of the dither motion of the gyro block; and
   feedback means electrically connected to the differential amplifier means for receiving the difference voltage and for generating a feedback signal to be fed to the torquer amplifier, thereby effecting a closed electrical feedback loop to constantly maintain an optimal dither rate for the gyro block.

12. The system of claim 11, wherein the plurality of piezoelectric elements are connected in parallel to the output of the torquer amplifier, the piezoelectric elements deforming in response to the output signal for dithering the gyro block; and
   wherein the piezoelectric elements in combination produce a capacitive current component and a back current component.

13. The system of claim 12, wherein the capacitive current component has a corresponding current which together with the resistor means produce a component voltage that is equal in magnitude but opposite in sense to the buck voltage.

14. The system of claim 11, wherein the feedback means comprises an automatic gain control circuit and a multiplier circuit.

15. In a ring laser gyroscope assembly having a gyro block and a plurality of piezoelectric elements each fixedly coupled to a leaf of a suspension spring means for dithering the gyro block, a method of utilizing each piezoelectric element for both dithering the gyro block and for sensing motion of the gyro block, the method comprising the steps of:
   electrically connecting the plurality of piezoelectric element in parallel to an output of a torquer amplifier;
   feeding an output signal from the torquer amplifier to the piezoelectric elements to effect a deformation rate thereto for dithering the gyro block, the piezoelectric elements producing a first current due to capacitance and motion of the gyro block;
   interposing a resistor means between the torquer amplifier and the piezoelectric elements to convert the first current into a voltage drop;
   inserting a series connected resistor ad capacitor means between the torquer amplifier and ground to produce a buck voltage;
   subtracting the buck voltage from the voltage drop to produce a difference voltage, the difference voltage representing the dither motion of the gyro block; and
   sending the difference voltage to a feedback means;
   whereby the feedback means generates a feedback signal to the torquer amplifier, thereby completing a closed electrical feedback loop to constantly maintain an optimal dither rate for the gyro block.

16. The method of claim 15, wherein the first current is produced by combining a capacitive current component and a back current component.

17. The method of claim 15, wherein the subtracting step comprises using a differential amplifier for receiving at different inputs thereof the buck voltage and voltage drop to produce the difference voltage.

18. In an assembly having a plurality of piezoelectric elements each fixedly coupled to a movable element of the assembly, a method of utilizing each piezoelectric element to both torque the movable element fixed thereto and to respond to deflections resulting therefrom, the deflections setting the assembly in motion, the method comprising the steps of:
   electrically connecting each piezoelectric element in parallel to an output of a first amplifier;
   feeding an output signal from the first amplifier to the piezoelectric elements to effect a deflection rate to move the assembly, the piezoelectric elements further producing a first current in response to the deflection rate;
   connecting a capacitance means from the output of the first amplifier to ground to generate a second current;
   adapting a transformer means to receive both the first and second currents and to produce a third current representing the difference between the first and second currents;
   converting the third current into a voltage and feeding the same to a feedback means, the feedback means providing a feedback signal to the first amplifier;
   thereby effecting an electrical feedback loop to maintain an optimal deflection rate for the assembly.

19. The method according to claim 18, wherein the first current is produced by combining a capacitive current component, an effective resistance component and a back current component.

20. The method according to claim 18, wherein the adapting step comprises:
   electrically coupling the transformer means to the output of the first amplifier and an input of a second amplifier;
   electrically coupling the transformer means in parallel to the capacitance means.

21. The method according to claim 19, further comprising the step of matching the capacitance value of the capacitive current component with the capacitance value of the capacitance means.

22. In an assembly having a plurality of piezoelectric elements each fixedly coupled to a corresponding movable element of the assembly, a method of utilizing all of the piezoelectric elements to both torque their respective movable elements and to respond to deflections resulting therefrom, the deflections setting the assembly in motion, the method comprising the steps of:

electrically connecting each piezoelectric element in parallel to an output of a first amplifier;

feeding an output signal from the first amplifier to the piezoelectric elements to effect a deflection rate thereto to move the assembly, the piezoelectric elements producing a first current in response to the rate of movement of the assembly;

interposing a resistor means between the first amplifier and the piezoelectric elements to convert the first current into a first voltage;

inserting a series connected resistor and capacitor means between the first amplifier and ground to produce a second voltage;

subtracting the second voltage from the first voltage to produce a difference voltage representative of the motion of the assembly;

utilizing the difference voltage to generate a feedback signal to the first amplifier, thereby completing an electrical circuit to effect an optimal deflection rate for the assembly.

23. The method according to claim 22, wherein the first current is produced by combining a capacitive current component and a back current component.

* * * * *